(12) United States Patent
Giorgetti et al.

(10) Patent No.: US 6,415,894 B2
(45) Date of Patent: *Jul. 9, 2002

(54) PARKING BRAKE

(75) Inventors: Alberto Giorgetti, Bergamo; Antonio Braiato, Turin, both of (IT)

(73) Assignee: Freni Brembo S.p.A., Bergamo (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/899,509

(22) Filed: Jul. 24, 1997

(30) Foreign Application Priority Data

Aug. 2, 1996 (IT) ..................................... MI96A001691

(51) Int. Cl.$^7$ ........................... B60T 1/06; F16D 65/10; F16D 65/08
(52) U.S. Cl. ................ 188/218 R; 188/18 R; 188/264 R; 188/78; 188/70 R
(58) Field of Search ............. 188/218 R, 18 R, 188/18 A, 250 E, 70 R, 250 G, 264 E, 264 B, 264 D, 78, 264 R, 250 R, 336, 366, 250 A, 17; 451/415, 61, 63, 527; 192/107 R, 107 M, 107 T, 113.36, 113.22, 70.14; 301/6.3, 6.1, 6.6, 6.7

(56) References Cited

U.S. PATENT DOCUMENTS

| | | | | |
|---|---|---|---|---|
| 1,818,100 A | * | 8/1931 | Shields | 188/218 R |
| 1,846,816 A | * | 2/1932 | Skelly | 188/218 R |
| 1,978,563 A | * | 10/1934 | Bragg | 188/218 R |
| 2,126,945 A | * | 8/1938 | Bragg | 188/17 |
| 2,516,544 A | * | 7/1950 | Breeze | 188/218 R |
| 2,702,613 A | * | 2/1955 | Walther, Sr. | 188/218 R |
| 2,978,073 A | * | 4/1961 | Soddy | 188/264 R |
| 3,007,553 A | * | 11/1961 | Sinclair et al. | |
| 3,066,766 A | * | 12/1962 | Minor et al. | 188/218 R |
| 3,347,345 A | * | 10/1967 | Rogers et al. | |
| 4,385,429 A | * | 5/1983 | Crankshaw | |
| 4,674,606 A | * | 6/1987 | Denton | 188/264 R |
| 5,238,091 A | * | 8/1993 | Nakagawa et al. | |
| 5,246,093 A | * | 9/1993 | Wang | |
| 5,352,305 A | * | 10/1994 | Hester | |
| 5,385,216 A | * | 1/1995 | Kulczycki | 188/70 R |
| 5,816,901 A | * | 10/1998 | Sirany | |

FOREIGN PATENT DOCUMENTS

| | | | | |
|---|---|---|---|---|
| CH | 203755 | * | 3/1939 | 188/218 R |
| EP | 0537987 | * | 4/1993 | |
| EP | 0833070 | * | 4/1998 | |
| FR | 1337353 | * | 7/1962 | 188/218 R |
| GB | 1415193 | * | 11/1975 | |
| WO | 9531650 | * | 11/1995 | |

* cited by examiner

*Primary Examiner*—Douglas C. Butler
(74) *Attorney, Agent, or Firm*—Sofer & Haroun, LLP

(57) ABSTRACT

A parking brake for vehicles, which guarantees safe parking from the very first time it is actuated, comprises a drum and at least one shoe intended to press against a cylindrical surface formed on the inside of the drum, recesses and projections being provided on said surface.

20 Claims, 3 Drawing Sheets

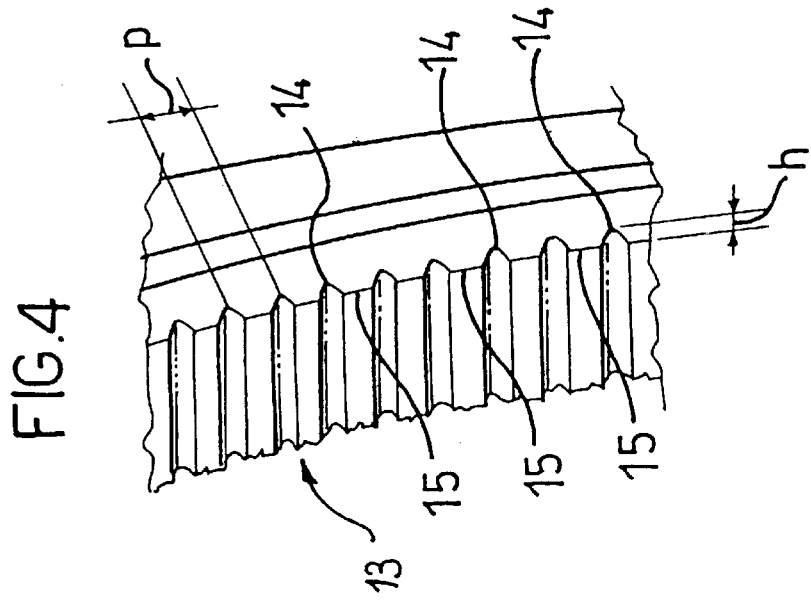
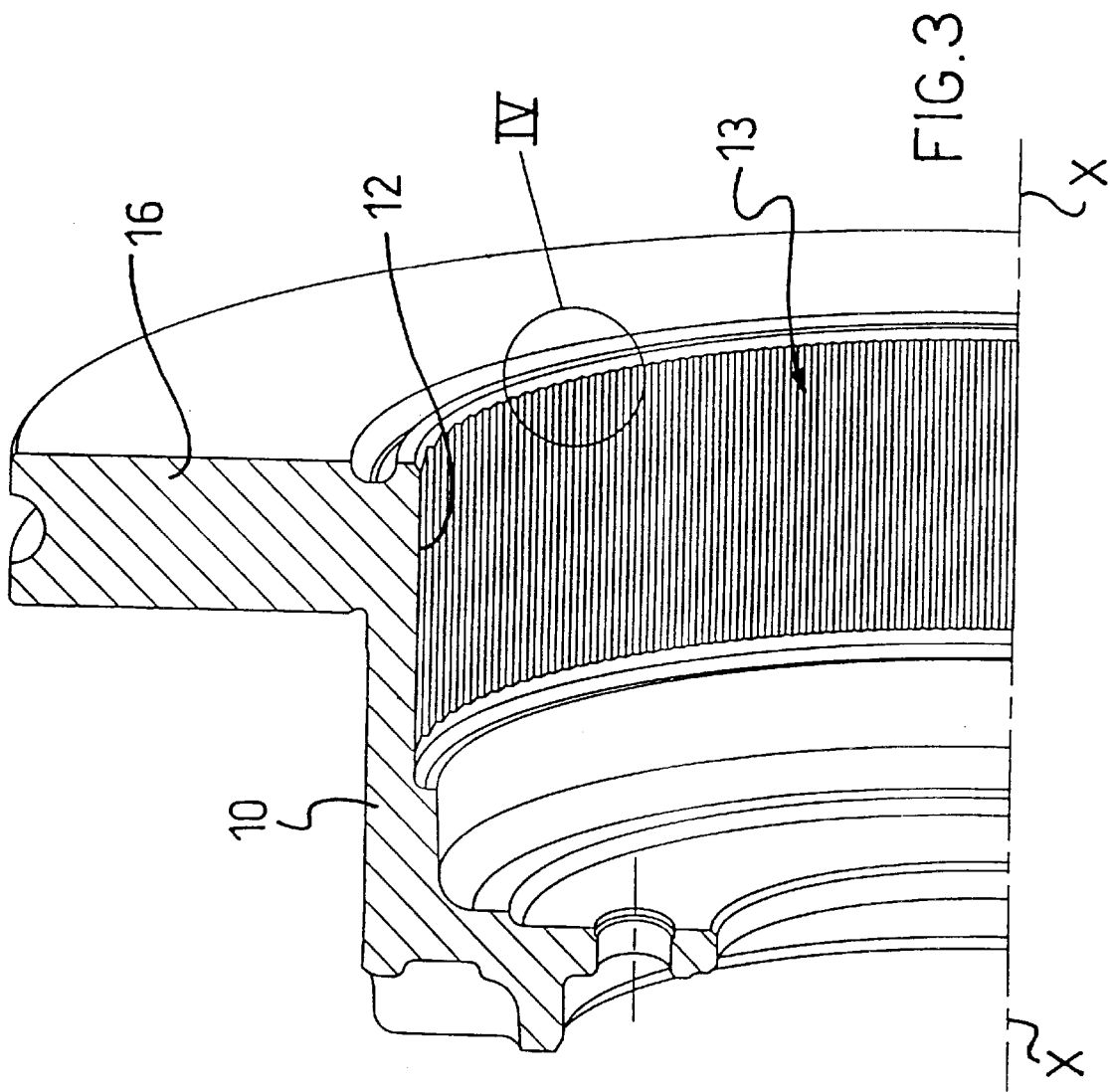

PARKING BRAKE

FIELD OF THE INVENTION

The present invention relates to a parking brake for vehicles, of the type that comprises a drum and at least one shoe intended to press against a cylindrical surface formed on the inside of the drum.

BACKGROUND OF THE INVENTION

In vehicles fitted with disc brakes on the rear wheels, it is part of the prior art to provide each disc brake with a drum-type parking brake comprising a drum and at least one shoe intended to be pressed against said drum when the so-called handbrake is operated.

It is also known that in order to ensure that the user can park the vehicle satisfactorily, even on the very first occasion on which the handbrake is operated, the brake has to be "worn in" at the time of manufacture of the vehicle by putting the vehicle, which may in particular be an industrial vehicle, truck or the like, through repeated braking cycles, i.e. a specific wearing-in of the brake. This procedure obviously adds to the cost.

It has been suggested that the cylindrical surface formed on the inside of the drum be coated with a layer of chromium. This solution enables the wearing-in process to be dispensed with but is unattractive from a cost point of view because it means extra work at the drum processing stage, the drum having to undergo a complex and expensive extra process owing in part to the necessity of protecting with suitable coatings those parts of the component that are not to be chrome-plated.

The starting point of the present invention is the problem of devising a parking brake whose structural and functional characteristics are such as to overcome the abovementioned disadvantages.

SUMMARY OF THE INVENTION

This problem is solved by a parking brake of the specified type, which is characterized by the fact that it comprises surface irregularities formed in the cylindrical surface.

BRIEF DESCRIPTION OF THE DRAWINGS

Further characteristics and advantages of the parking brake according to the present invention will emerge prom the description given below of an example of an embodiment thereof, provided by way of non-restrictive indication, with reference to the accompanying figures, in which:

FIG. 3 shows a perspective view with partial section of a component of the parking brake according to the present invention, and FIG. 4 shows a perspective view, much enlarged, of a detail of the component of FIG. 3.

DETAILED DESCRIPTION OF THE INVENTION

Figure 1:
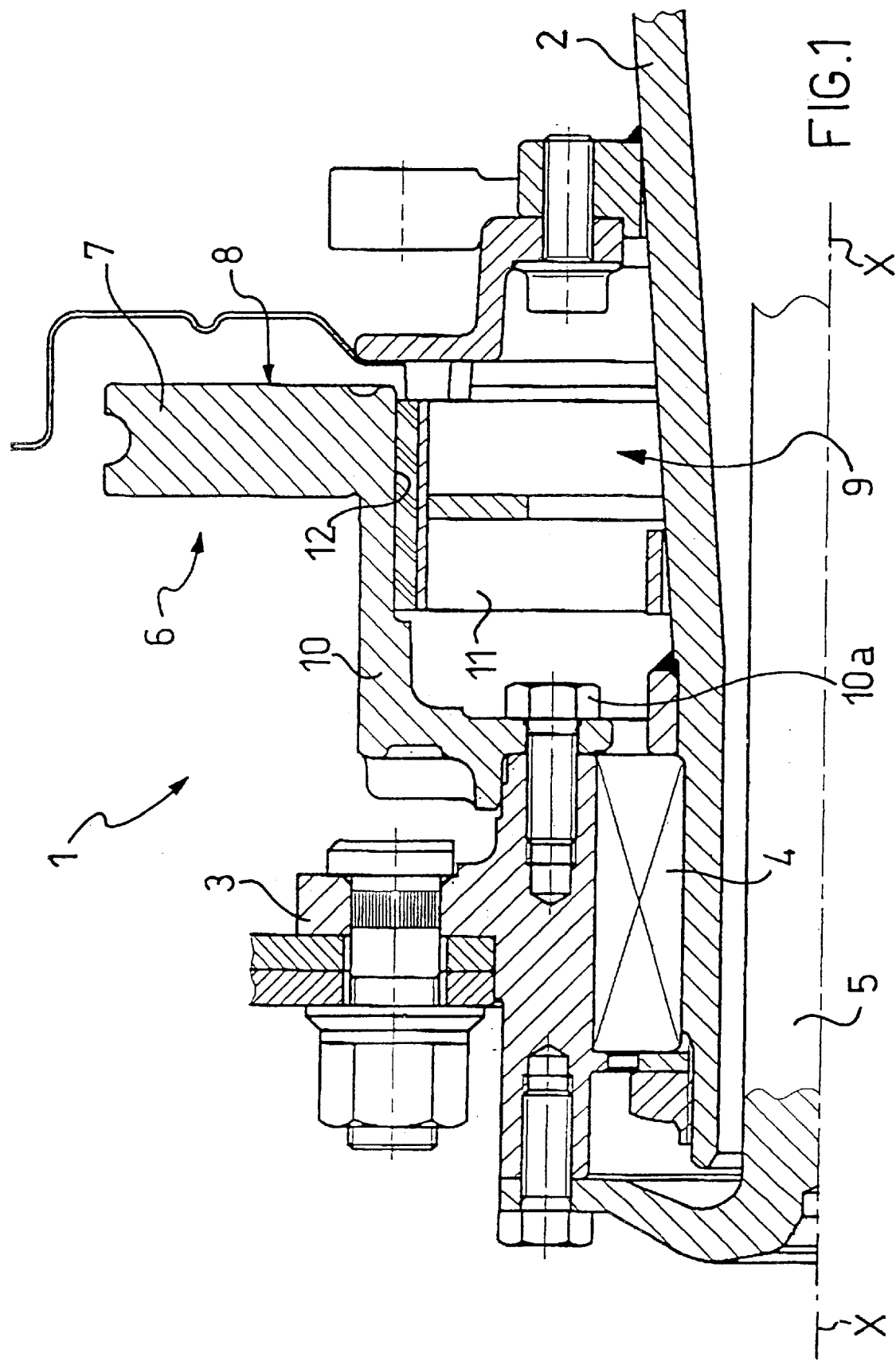
FIG. 1 shows a sectional view of a part of a vehicle incorporating the parking brake according to the invention.
Figure 2:
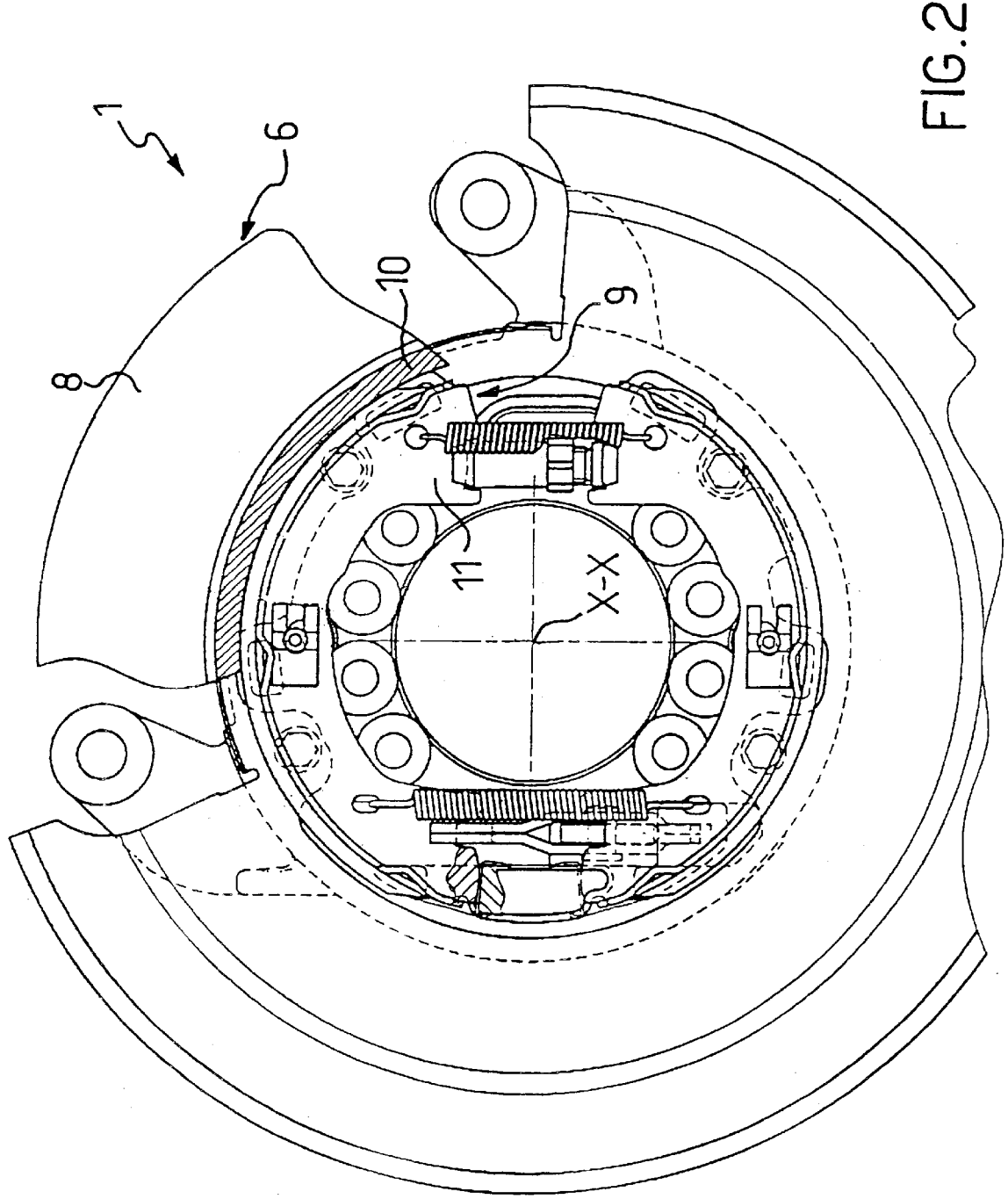
FIG. 2 shows an end view of the same portion of the vehicle as in FIG. 1.

With reference to the accompanying figures, the numeral 1 is a general reference for part of a vehicle, for example an industrial vehicle, a truck, a car, or the like, comprising a rear axle 2 with axis X—X, and a hub 3 for a rear wheel, the hub being rotatably supported by the axle 2 on bearings 4 and rotated by a shaft 5.

6 is a disc brake, in itself conventional, of which the drawing shows only a braking annulus 7 of its disc 8.

9 is a parking brake according to the invention.

The parking brake 9 comprises a drum 10 that is bolted 10a to the hub 3, and two shoes 11 mounted on the axle 2 and intended to press when operated by control means known per se against a cylindrical surface 12 formed on the inside of the drum 10.

Formed on the cylindrical surface 12 are surface irregularities 13, basically irregularities of shape, which take the form of a plurality of recesses 14 and a plurality of projections 15, both 14 and 15 extending along generatrices of the cylindrical surface 12. The recesses 14 and the projections 15 alternate with each other and are distributed at a regular pitch. In the example, the pitch, indicated in the figure by p, is equal to 1 mm. The recesses 14 are essentially equilateral triangles in cross-section, with convex sides and a rounded vertex.

The recesses 14 have a defined limited depth, indicated in the figure by h, of between 0.03 mm and 0.08 mm. The projections 15 have a basically flat peak belonging to the cylindrical surface 12.

The recesses are preferably produced by the action of a knurling tool on the cylindrical surface 12. The knurling operation is rapidly performed on the cylindrical surface 12, subsequent to its being finished-turned.

The drum comprises an annular portion 16 formed integrally on the outside and serving as the braking annulus 7 of the disc brake 6.

In operation, when the parking brake is used for the first time, the shoes come into contact with the internal surface where they meet the surface irregularities that have been formed upon the latter. An immediate bedding-in takes place between the shoes and the internal surface.

It has been found that by virtue of this bedding-in, the parking brake in accordance with the present invention performs at maximum efficiency from the first time it is operated, without requiring preparatory running-in or the preliminary application of expensive coatings.

Another advantage of the parking brake according to the present invention is the simplicity of its manufacture, which is not the least advantage for an item intended to be mass-produced and which must give long and reliable service.

Clearly, a person skilled in the art will be able, in order to satisfy individual and particular needs, to modify and vary the above-described parking brake in numerous ways, all however remaining within the scope of protection of the invention as defined by the following claims.

We claim:

1. A parking brake for vehicles, said parking brake comprising:
    a shoe for directly frictionally engaging a braking surface of a drum;
    said drum formed of a single material, said drum having said braking surface formed of said single material on an inside of said drum, said braking surface having grooved recesses and projections formed thereon; said grooved recesses and said projections extending axially along said braking surface;
    said grooved recesses and said projections are alternated with each other at a regular pitch transversely to the axial direction; and said grooved recesses and said projections causing a bedding-in of said shoe in said braking surface when said shoe directly engages said braking surface.

2. A parking brake according to claim 1, wherein said pitch adopted is substantially equal to 1 mm, not less than 0.5 mm and not more than 2.0 mm.

3. A parking brake according to claim 1, wherein said grooves have a given limited depth of between 0.03 mm and 0.08 mm.

4. A parking brake according to claim 1, wherein said grooves are produced by action of a knurling tool on said inside of said drum.

5. A parking brake according to claim 4, wherein it comprises an annular portion formed integrally with said drum on an outside of said drum, said portion constituting a braking annulus of a disc of a disc brake.

6. A parking brake according to claim 1, wherein said grooves are triangular in cross-section and said groove cross section is substantially uniform along the length of said groove.

7. A parking brake according to claim 1, wherein said pitch adopted is substantially equal to 1 mm, not less than 0.5 mm and not tore than 2.0 mm.

8. A parking brake according to claim 1, wherein said grooves have a given limited depth of between 0.03 mm and 0.08 mm.

9. A parking brake according to claim 1, wherein said grooves are produced by action of a knurling tool on said inside of said drum.

10. A parking brake according to claim 9, wherein it comprises an annular portion formed integrally with said drum on an outside of said drum, said portion constituting a braking annulus of a disc of a disc brake.

11. A parking brake according to claim 1, wherein each of said recesses has convex sides and a rounded vertex.

12. A parking brake for vehicles as claimed in claim 1, said shoe further comprising a lining material, wherein said grooved recesses and said projections disposed on said braking surface cause a bedding-in of said lining material of said shoe in said braking surface when said lining material directly engages said braking surface.

13. A parking brake for vehicles, said parking brake comprising:

a shoe for directly frictionally engaging a braking surface of a drum;

said drum being formed of a single material and having said braking surface formed of said single material on an inside of said drum; and said braking surface being entirely knurled for causing a bedding-in of said shoe in the braking surface when said shoe directly engages said braking surface.

14. A parking brake according to claim 13, wherein said braking surface further comprises grooved recesses, wherein each of said recesses has convex sides and a rounded vertex.

15. A parking brake according to claim 13, wherein said shoe has a substantially smooth surface.

16. A parking brake for vehicles, said parking brake comprising:

a shoe for directly frictionally engaging braking surface of a drum;

said drum being formed of a single material, said drum having a braking surface formed of said single material on an inside of said drum, said braking surface having grooved recesses and projections thereon;

said grooved recesses and said projections are produced by the action of a knurling tool on said braking surface;

said grooved recesses and said projections extending axially along said braking surface;

said grooved recesses and said projections are alternated with each other at a regular pitch transversally to the axial direction; and said grooved recesses and said projections causing a bedding-in of said shoe in said braking surface when said shoe directly engages said braking surface.

17. A parking brake according to claim 16, wherein said grooves are triangular in cross-section and a cross section of each of said grooves is substantially uniform along the length of each of said grooves.

18. A parking brake according to claim 16, wherein the pitch adopted is substantially equal to 1 mm, not less than 0.5 mm and not more than 2.0 mm.

19. A parking brake according to claim 16, wherein said grooves have a given limited depth of between 0.03 mm and 0.08 mm.

20. A parking brake according to claim 16, wherein it comprises an annular portion formed integrally with said drum on an outside of said drum, said portion constituting a braking annulus of disk of a disk brake.

* * * * *